United States Patent
Istre, Jr.

(10) Patent No.: US 7,040,339 B2
(45) Date of Patent: May 9, 2006

(54) SUCTION INLET VALVE FOR FIRE TRUCK PUMPERS

(75) Inventor: Roy Istre, Jr., Corsicana, TX (US)

(73) Assignee: Hydra-Shield Manufacturing, Inc., Irving, TX (US)

( * ) Notice: Subject to any disclaimer, the term of this patent is extended or adjusted under 35 U.S.C. 154(b) by 0 days.

(21) Appl. No.: 10/813,552

(22) Filed: Mar. 31, 2004

(65) Prior Publication Data

US 2005/0217726 A1    Oct. 6, 2005

(51) Int. Cl.
F16K 15/06    (2006.01)
(52) U.S. Cl. .................. 137/220; 137/881; 251/83
(58) Field of Classification Search ............ 137/220, 137/522, 523, 543, 881; 251/83
See application file for complete search history.

(56) References Cited

U.S. PATENT DOCUMENTS

| 1,944,249 A | * | 1/1934 | Lencke ............... 137/596 |
| 4,580,596 A | * | 4/1986 | Stehling ............. 137/523 |
| 5,178,185 A | * | 1/1993 | Stehling et al. ...... 137/543 |

* cited by examiner

Primary Examiner—John Fox
(74) Attorney, Agent, or Firm—Millen, White, Zelano & Branigan, P.C.

(57) ABSTRACT

A suction inlet valve for fire truck pumpers has a male body portion and a female body portion, the portions defining a chamber therein. A cone-shaped valve element is connected to a valve stem which has a cam body thereon with a cam slot therein. The cam slot receives a projection from an operating shaft which projects out of the housing. The operating shaft has an operating handle thereon which is exposed to the environment and conducts heat from the chamber. If there is water in the chamber, there is an increased chance of water in the cam slot freezing disabling operation of the valve. To drain water away from the cam slot, a drain is provided in the male body portion for draining water from the chamber.

3 Claims, 4 Drawing Sheets

SUCTION INLET VALVE FOR FIRE TRUCK PUMPERS

FIELD OF THE INVENTION

This invention relates to suction inlet valves for fire truck pumpers. More particularly, this invention relates to suction inlet valves for fire truck pumpers usable in both hydrant and drafting operations.

BACKGROUND ART

Fire companies utilize pumper trucks to increase the pressure of hydrant water flowing through fire hoses and to pressurized water from drafting tanks. Pumpers draw water through suction valves from sources such as portable water tanks or fire hydrants.

Illustrative of widely used suction inlet valve are the Pre-Con valves available from Hydra-Shield Manufacturing, Inc. of Irving, Tex., covered by U.S. Pat. No. 5,178,185. The Pre-Con valve is designed to operate as an automatic flow control valve which eliminates the need for manual adjustments in reaction to water flow. In hydrant operations, the Pre-Con valve automatically opens in proportion to the flow demand and is capable of automatically balancing flow between multiple water sources. The Pre-Con valve's automatic check valve action also minimizes water hammer. When drafting from a source of water, such as a portable water tank, the check valve action of the Pre-Con valve holds prime water when flow is stopped and allows switching to a booster tank and back to drafting without flow interruption. The Pre-Con valve is an improvement over butterfly valves which it has replaced in many situations.

Pre-Con valves have continued to improve over the years with current configurations having follower-in-slot cam operators rather than external profile cam operators. It has been found that these current configurations have a tendency to freeze in cold weather which can render the valve and associated equipment at least temporarily useless in cold weather.

SUMMARY OF THE INVENTION

The present invention is directed to an inlet suction valve use with pumper fire trucks. The inlet suction valve comprises a valve housing having a male body portion defining a first cavity and a female body portion defining a second cavity, the body portions are joined with the cavities forming a chamber. A first coupling is provided on the male body portion for coupling with a source of water and a second coupling is provided on the female body member for coupling with a pumper boaster tank on the fire truck. A valve element is disposed in the first cavity and is seated against a valve seat located adjacent to the first coupling. A valve support with an axial hole therethrough is disposed between the first and second cavities of the male and female bodies. The valve support has openings therethrough allowing water to flow freely from the first cavity to the second cavity. A valve stem is connected to the valve element and extends back through the first cavity and the axial hole in the valve support to the second cavity. A cam block is located on the calve stem and has a slot extending therein laterally with respect to the axis of the valve stem. A valve operating shaft extends from outside the housing to the cam block, the valve operating shaft having a crank arm extending laterally therefrom with a projection thereon that is spaced from the axis of the valve operating shaft. The projection is received in the slot in the cam body. A valved drain extends through the female valve body and in to the second cavity to drain water away from the cam body to avoid frozen water from clogging the slot and preventing operation of the valve.

In a further aspect of the invention, an operating handle projects from the operating shaft.

In still a further aspect of the invention, the operating handle is a lever and a lateral hole formed through a portion of the support to receive the operating shaft therethrough. The inlet suction valve is made substantially of metal and lubricant disposed around the valve stem and operating shaft.

In still a further aspect of the invention, a valved vent outlet is disposed on the male body member and is connected by a bore through the male body member to the first coupling at a location in front of the valve element. The valved vent outlet on the male body member is located at the bottom of the female housing directly adjacent to the water drain on the female body member.

BRIEF DESCRIPTION OF THE DRAWINGS

Various other features and attendant advantages of the present invention will be more fully appreciated as the same becomes understood when considered in conjunction with the accompanying drawings, in which like reference characters designate the same or similar parts throughout the several views, and wherein.

DETAILED DESCRIPTION

Figure 1:
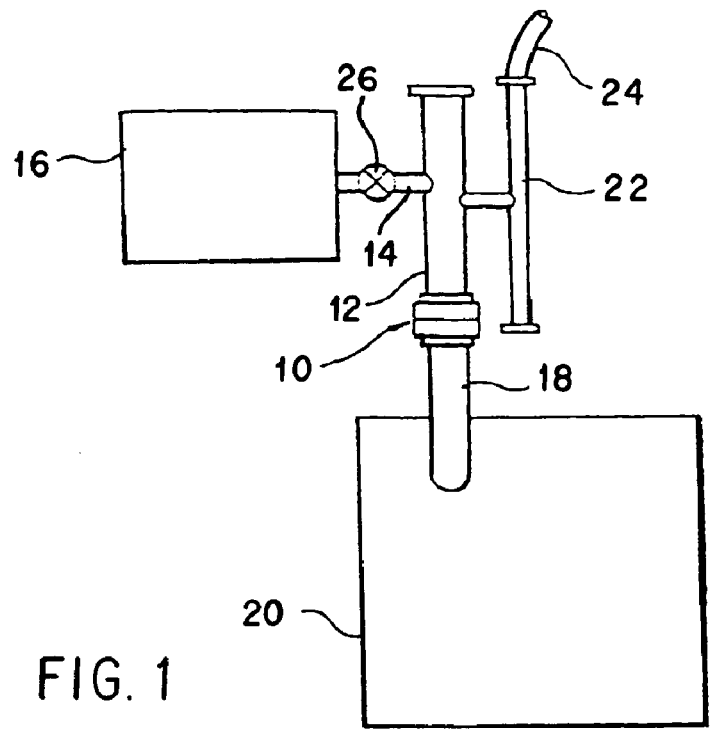
FIG. 1 is a schematic view showing a suction inlet valve of the instant invention drafting water from a portable water tank.

Referring now to FIG. 1, a suction inlet valve designated by the numeral 10 and configured in accordance with the principles of the instant invention, is disposed at the end of a suction pipe 12 used in a drafting operation. The suction pipe 12 is connected by a line 14 to a pumper booster tank 16 within a pumper firetruck (not shown). At its inlet end the suction valve is connected by a suction hose 18 to a source of water, such as a portable water tank 20. A pump discharge manifold 22 is connected to fire hoses 24 at either or both ends. Upon opening a booster tank valve 26, water is forced at elevated pressure through the fire hoses 24.

After the pump in the firetruck (not shown) is primed and activated, the suction inlet valve 10 automatically opens at about 8 to 10 inches of vacuum if set in an automatic mode. Normally, the suction inlet valve 10 automatically opens or closes in proportion to the volume of water flow.

If the water level in the tank 20 gets too low, the booster valve 26 is opened to decrease the flow resistance from the booster tank 16 allowing the suction inlet valve 10 to automatically close and thereby hold prime water in the suction hose 18. When the water level in the portable tank 20 is restored, the booster valve is closed so as to create a vacuum in the pump which automatically opens the suction inlet valve 10.

If it is desired to utilize the pumper booster tank 16 as an emergency reservoir, the suction inlet valve 10 allows the operator to switch from drafting from the portable water tank 20 to drafting from the booster tank 16 without disrupting water flow through the fire hoses 24. In the event that all discharge lines 24 are shut off, the suction inlet valve 10 automatically closes to hold prime in the suction hose 18.

From the above discussion, it is seen that the suction inlet valve 10 is critical to proper operation of a pumper firetruck. In order to tune the system to particular situations, it is advantageous to have the capability of manually adjusting the amount that suction inlet valve 10 opens.

Figure 2:
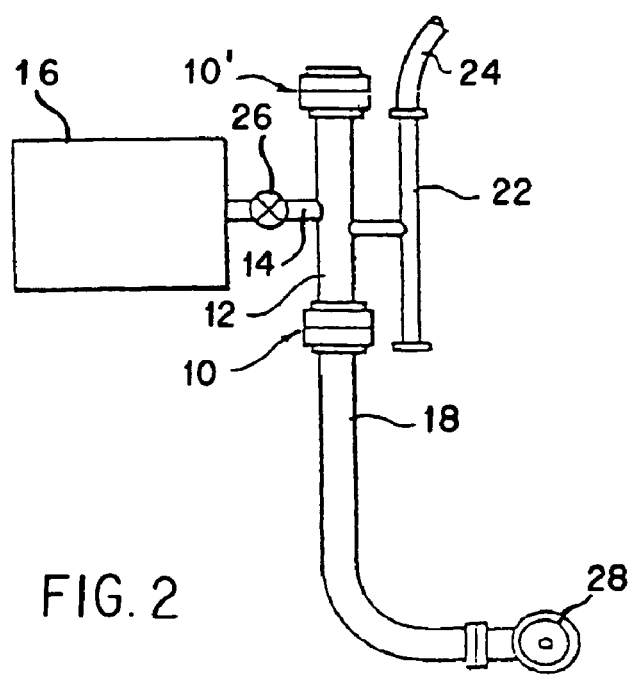
FIG. 2 is a schematic illustration showing use of a suction valve according to the instant invention being used with a fire hydrant.

Referring now to FIG. 2 where similar elements have the same reference numerals, a pumper truck is schematically shown working from a fire hydrant 28. When the hydrant 28 is turned on, water pressure automatically opens the suction inlet valve 10 if the valve has been manually adjusted for automatic operation. The suction inlet valve 10 opens at approximately 5 psi and will open in proportion to the flow demand. When flow is shut off through the pump discharge line 22, the suction inlet valve 10 automatically closes and, due to its novel configuration, reduces the water hammer effect in the suction hose 18 and fire hydrant 28. If it is desired to provide water from an auxiliary source, an additional inlet suction valve 10' can be connected to the opposite end of pump suction line 12.

When working from a fire hydrant 28, it is advantageous to provide for automatic operation of the suction inlet valve 10, which automatic operation can be adjusted and if necessary, overridden. This is especially so when there are pair of suction inlet valves 10 connected to the same pump suction line 12. As will be explained in detail hereinafter, the suction inlet valve 10 has a control handle which determines the setting of automatic flow control pumper suction inlets. In its automatic mode, the valve 10 automatically opens or closes in response to flow demand. As more discharge lines are opened from a pumper truck, or if nozzle flows increase, the valve 10 automatically opens to the limit of the control handle setting. If flow is reduced, the valve 10 automatically closes proportionally and when flow is stopped, the valve closes completely. Automatic adjustment and operation is particularly important in reducing the effects of water hammer caused by abruptly shutting off a nozzle attached to a fire hose 24.

The valve 10 also functions as a one way flow valve. During fire hydrant operations (FIG. 2), high pressure water sources which occur during operations such as pump relay operations, are prevented by the valves 10 from overriding low pressure water sources. Moreover, multiple inlets with the valves 10 can be used to balance the water flow from several different sources. When used in the drafting mode of FIG. 1, the automatic check valve action of valve 10 holds prime water in the suction hose 18 when flow is stopped. This is very important because the system does not have to reprimed to restart the pumping operation.

Figure 3:
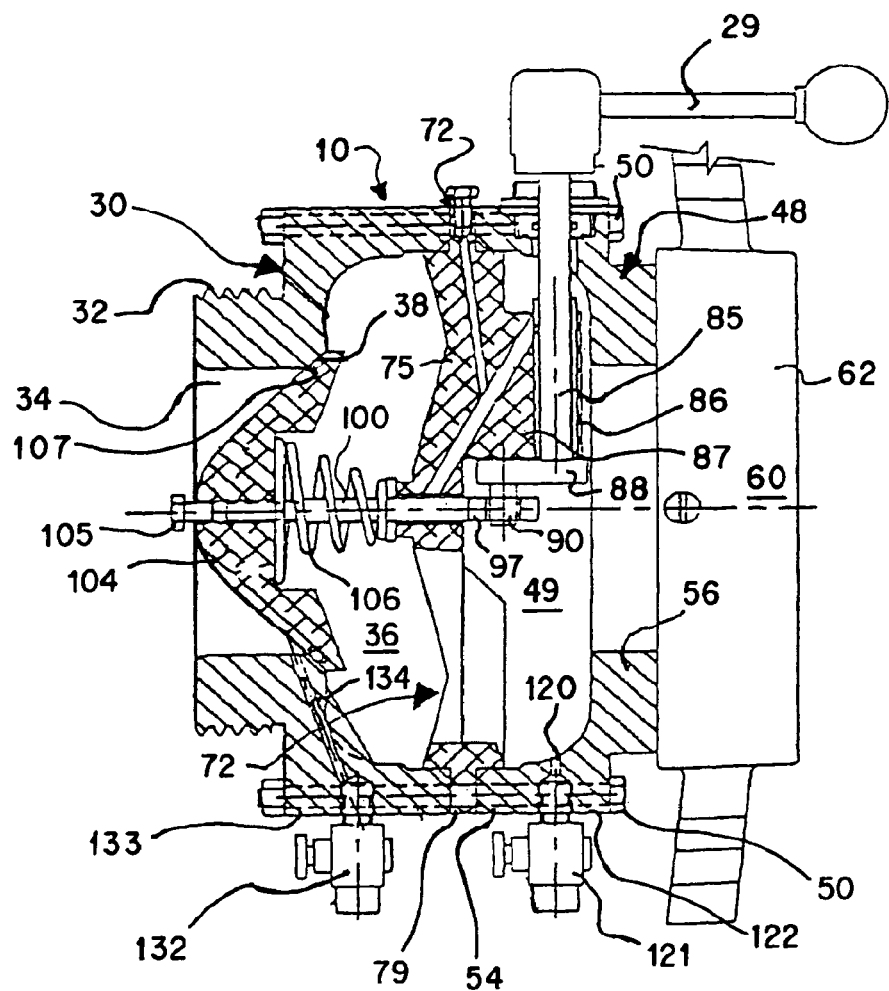
FIG. 3 is a side elevation of the suction inlet valve according to the present invention.
Figure 4:
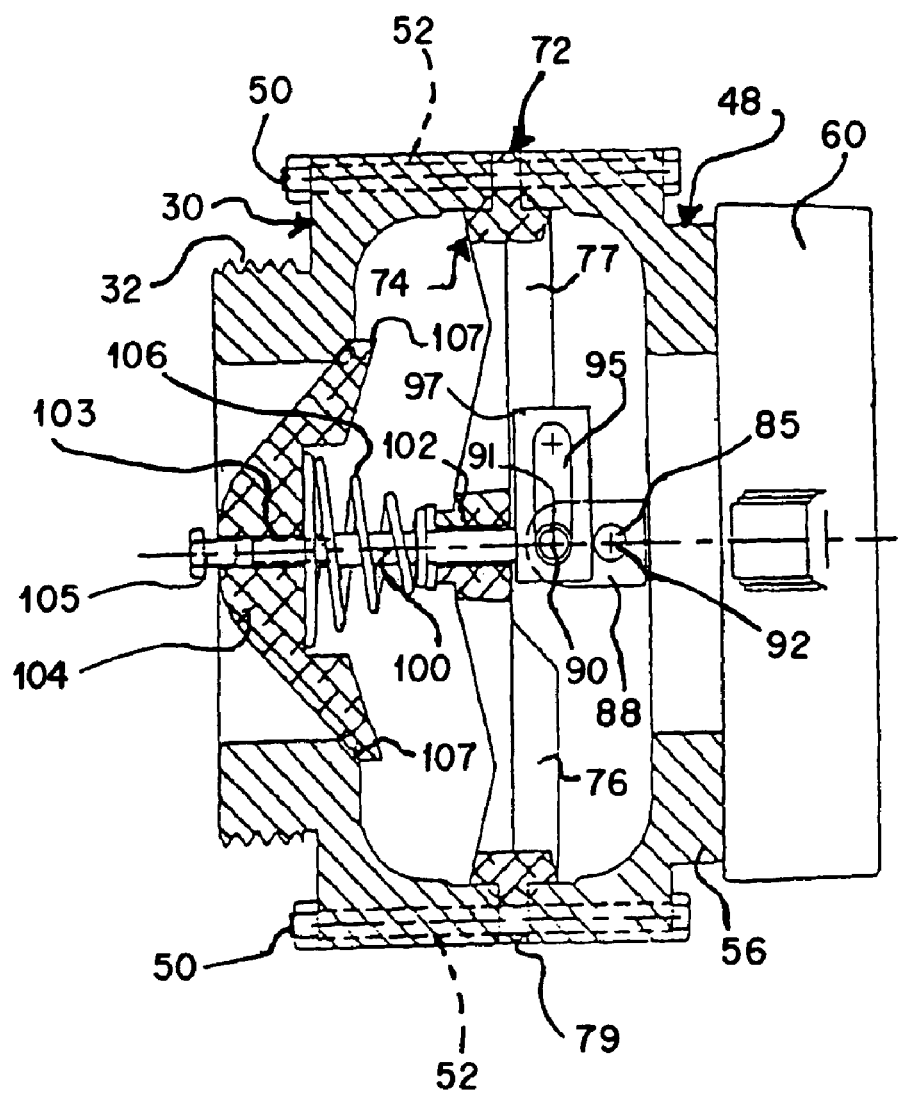
FIG. 4 is a top elevation taken along lines 4—4 of FIG. 3.
Figure 5:
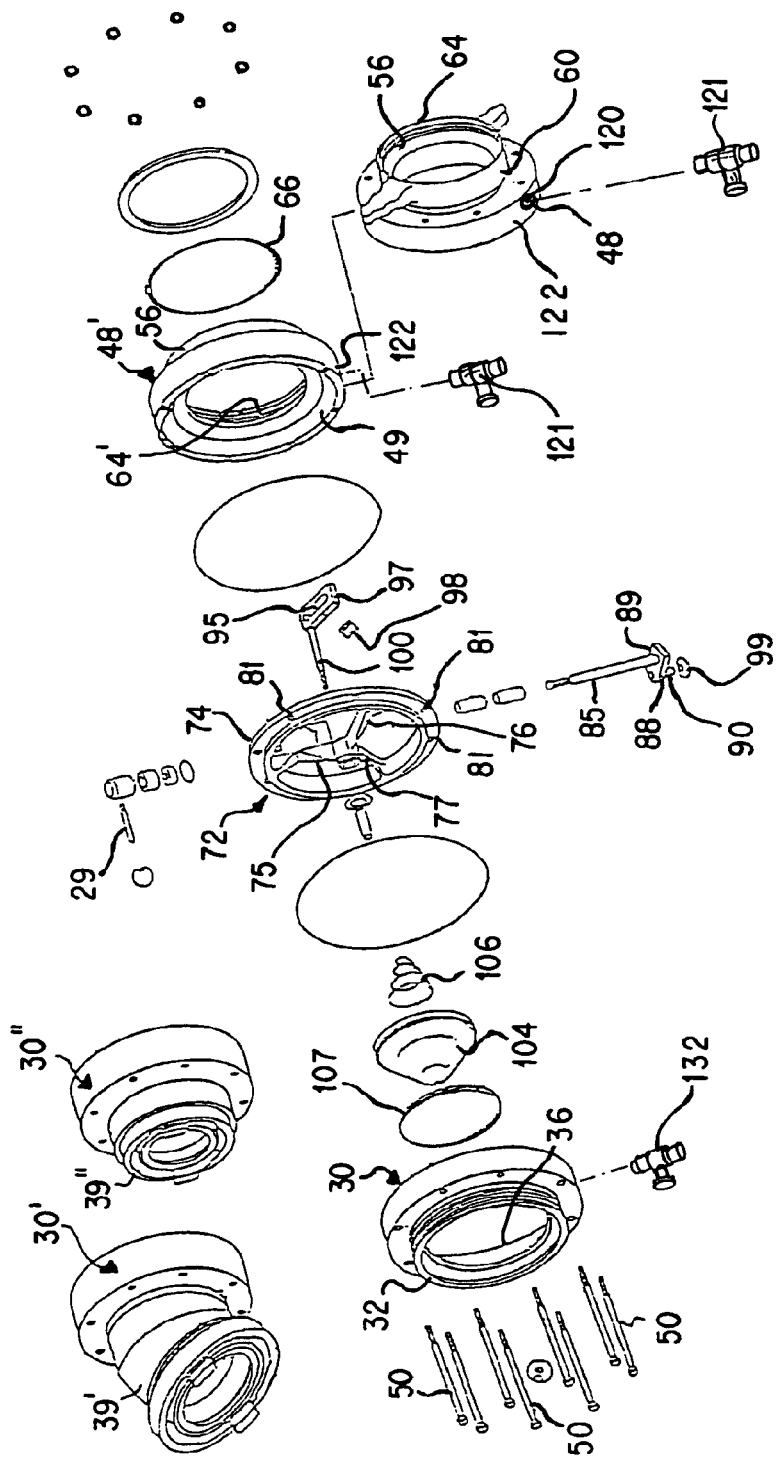
FIG. 5 is an exploded view of the suction inlet valve of FIGS. 3 and 4.

With the foregoing background in mind, a particular structure of the valve 10 suitable for providing automatic operation which is manually adjustable is set forth in FIGS. 3–5. Referring first to FIG. 3, it is seen that the valve 10 has an operating lever 29 which selectively sets the mode to a fully "closed" mode, a fully "open" mode or a setting selected therebetween. The valve 10 opens automatically at any setting other than fully closed mode, however, the volume of flow is reduced at settings other than the fully open mode.

Referring now also to FIGS. 4 and 5 as well as FIG. 3, the valve 10 comprises a male body portion 30 which has a threaded neck 32 onto which is threaded a suction hose such as the suction hose 18 of FIGS. 1 and 2. The neck 32 has a mouth 34 therein into which water flows. The water may be under pressure, such as the pressure applied from the fire hydrant 28 of FIG. 2, or may be unpressurized if provided by a source such as the portable water tank 20 of FIG. 1. The male body member 30 has a first cavity 36 with an annular substantially flat area 38 which joins the cavity 36 to the mouth 34. As is seen in FIG. 5, the male body member 30 may have alternate configurations 30' and 30" with Storz couplings 39' and 39", respectively.

Attached to the male valve body 30, is a female valve body 48 with a second cavity 49 therein. A plurality of bolts 50 are received through threaded bores 52 in an annular flange 54 around the periphery of the female body member 48. The female body member 48 has a neck 56 which has rotatably mounted thereon a threaded collar 60 which has internal threads 64. The threads 64 of the portable collar 60 threadably receive male fittings on the suction pipes 12 of FIGS. 1 and 2. In order to ensure a leakproof seal, a gasket 66 abuts the end of the neck 56 and is loosely received in an annular groove within the collar 60. Since the gasket 66 may be subject to considerable wear, it is readily replaceable.

The cavity 36 of the male valve body 30 and the cavity 49 of the female valve body 48 cooperate to define a chamber 72. Projecting radially inward into the chamber 72 from the female valve body 48 is a support ring 74 that includes three struts 75, 76 and 77 extending inwardly from an annular flange 79 that has an annular lip 80 with holes 81 therethrough. The bolts 50 which extend through the male and female bodies 30 and 48 pass through the holes 81 to retain the support 74 in the chamber 72 while separating the cavities 36 and 49 from one another.

A valve operating shaft 85 connected to the operating handle 29 extends through a bore 86 in a pedestal 87 on the strut 75. The valve operating shaft 85 has a crank arm 88 fixed to the bottom end 89 thereof. The crank arm 88 has a pin 90 aligned with an axis 91 spaced from the axis 92 of the valve operating shaft 85. The pin 90 registers with a slot 95 in a cam body 97. Preferably, the pin 90 drives a slide block 98 in the slot 95. The slide block 98 is retained on the pin 90 by a slide block retainer 99. A valve stem 100 is fixed to the cam body 97 and passes through a bore 102 in the support ring 74. The valve stem 100 is slidably received in a bore 103 through a cone-shaped valve element 104 and is axially adjusted with a set screw 105 in a threaded portion of the bore 103. A coil spring 106 extends between the support 74 and the valve element 103 to bias the valve element 103 to a closed position against an annular valve seat 107 on the annular flat portion 38.

Upon rotating the shaft 25 in the counter clock wise direction with respect to FIG. 4, the pin 90 slides laterally in the slot 95 extending in the cam body 97. As the pin 90 slides laterally in the slot 95, the pin draws the valve stem 100 back through the bore 103 against the bias of the spring 106 to pull the cone-shaped valve element 104 away from the annular valve seat 107.

There are some situations in which it is advantageous to manually adjust automatic operation of the floating valve element 103 instead of just letting the valve element float.

The valve 10 is usually left mounted on the fire truck so that there is a tendency for the valve to freeze and become useless in cold weather. This is especially a problem with the aforedescribed configuration where an operating handle 29 is rigidly connected to and operating shaft 85 that is in turn integral with a crank arm 88 and pin 90 because the pin 90 conducts heat rapidly away from the slot 95 in the cam body 97. Consequently, if there is water in the slot 95, the water can rapidly freeze in the slot blocking lateral movement of the pin 90 in the slot. If lateral movement of the pin 90 is blocked then the valve element 104 can not be unseated from the valve seat 107 and the valve 10 becomes useless. If the fire truck is racing for several miles through very cold air which flows over the handle 29, heat is conducted even more rapidly away from the pin 90. If the pin 90 and slot 95 are immersed in water, water in the slot may freeze thus blocking movement of the pin in the slot even if other retained water in the cavity is not yet frozen.

In order to prevent frozen water from blocking operation of the valve 10, a water drain 120 FIG. 3 with a rotating stop cock valve 121 is positioned at the bottom 122 of the cavity 49 of the female body 48. Another advantage of draining the chamber is that corrosion on the walls of the chamber and on parts of the cam operating mechanism is reduced. The water drain 120 is positioned in the bottom of the cavity 49 in female body 48 because another fluid vent or drain 130 operated by a stop cock valve 132 is positioned on the bottom 133 of the male body 30. The fluid vent or drain 130 is connected by a bore 134 to the mouth 34 of the threaded neck 32 and relieves excess pressure on the cone-shaped valve element 104.

From the foregoing description, one skilled in the art can easily ascertain the essential characteristics of this invention, and without departing form the spirit and scope thereof, can make various changes and modifications of the invention to adapt it to various usages and conditions.

I claim:

1. An suction inlet valve used with a pumper fire trucks, comprising:
   a metal valve housing having a male body portion defining a first cavity and a female body portion defining a second cavity, the body portions being joined and the cavities forming a chamber and the female body having a bottom wall portion in which water pools;
   a first metal coupling on the male body portion for coupling with a source of water and a second metal coupling on the female body member for coupling with a pumper booster tank on the fire truck;
   a metal valve element in the first cavity, the valve element being seated against a valve seat adjacent to the first coupling;
   a metal valve support with an axial hole therethrough for receiving the shank of the valve element, the valve support being disposed between the first and second cavities of the male and female bodies, the valve support having openings therethrough allowing water to flow freely from the first cavity to the second cavity, the valve support also having lateral hole therethrough;
   a metal valve stem connected to the valve element and extending back through the first cavity and the axial hole in the valve support to the second cavity;
   a metal cam block in the female portion with a slot extending therein laterally with respect to the axis of the valve stem;
   a metal valve operating shaft with an operating lever extending from outside the housing to the cam block, the valve operating shaft extending through the lateral hole in the female portion of the valve support and having a crank arm extending laterally therefrom in the female portion of the valve support with a projection thereon spaced from the axis of the valve operating shaft, the projection being received into the slot in the cam body, the valve operating shaft and lever transferring heat from metal components within the housing to the environment during cold weather;
   a water drain valve extending through the bottom wall portion of the female valve body and into the second cavity to drain water out of the housing to avoid clogging the slot in the cam block with frozen water, which clogging prevents operation of the suction inlet valve, and
   a valved air vent outlet disposed on the male body portion and connected by a bore through the male body portion to the first coupling at a location in front of the valve element, the valved air vent outlet being located at the bottom of the male body portion directly adjacent to the water drain valve mounted through the female body portion.

2. The suction inlet valve of claim 1, wherein lubricant is disposed around the valve stem and operating shaft.

3. The suction inlet valve of claim 1 wherein the operating handle is a metal lever.

* * * * *